United States Patent
Inaba et al.

[15] 3,674,808
[45] July 4, 1972

[54] 1-HYDROXYALKYL-2-AMINOMETHYL-INDOLE DERIVATIVES

[72] Inventors: Shigeho Inaba, Takarazuka; Mitsuhiro Akatsu, Ikeda; Hisao Yamamoto, Nishinomiya, all of Japan

[73] Assignee: Sumitomo Chemical Company, Ltd., Osaka, Japan

[22] Filed: Sept. 8, 1970

[21] Appl. No.: 70,564

[52] U.S. Cl. ............... 260/326.15, 260/239.3 D, 260/319.1, 260/326.13 R, 260/999
[51] Int. Cl. ..................................................... C07d 27/56
[58] Field of Search ............................................. 260/326.15

[56] References Cited

OTHER PUBLICATIONS

Wagner et al. Synthetic Organic Chemistry (1953) pp. 155, 658, 659

*Primary Examiner*—Alex Mazel
*Assistant Examiner*—Joseph A. Narcavage
*Attorney*—Stevens, Davis, Miller & Mosher

[57] ABSTRACT

Novel 1-hydroxyalkyl-2-aminomethylindole derivatives represented by the formula,

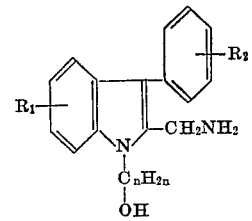

wherein $R_1$ and $R_2$ each represents hydrogen, halogen, $C_1$-$C_4$-alkyl, trifluoromethyl or nitro, and $n$ represents an integer of 1 to 4, or salts thereof, and a process for producing thereof.

The 1-hydroxyalkyl-2-aminomethylindole derivatives are very useful intermediates for producing 1-hydroxyalkyl-1,4-benzodiazepin-2-one derivatives having prominent effects as tranquillizers, muscle relaxants, antispasmodics, anticonvulsants and hypnotics.

1-Hydroxyalkyl-1,4-benzodiazepin-2-one derivatives are prepared by oxidizing the 1-hydroxyalkyl-2-aminomethylindole.

4 Claims, No Drawings

1-HYDROXYALKYL-2-AMINOMETHYL-INDOLE DERIVATIVES

The present invention relates to novel indole derivatives and a process for producing thereof. More particularly it pertains to novel 1-hydroxyalkyl-2-aminomethylindole derivatives of the formula,

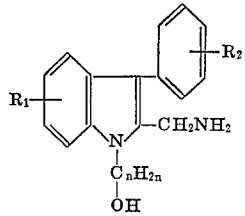

wherein $R_1$ and $R_2$ each represents hydrogen, halogen, $C_1$-$C_4$-alkyl, trifluoromethyl or nitro, and $n$ represents an integer of 1 to 4, or salts thereof, and a process for producing thereof.

In $R_1$ and $R_2$ of the above formula, examples of the halogen include chlorine, bromine, iodine and fluorine and examples of the $C_1$-$C_4$-alkyl include methyl, ethyl, n-propyl, isopropyl, n-butyl, isobutyl and tertiarybutyl. The —$C_nH_{2n}$—group is a straight or branched alkylene having one to four carbon atoms, and includes, for example, methylene, ethylene, methylethylene, trimethylene, ethyl ethylene and the like.

Hitherto it has been known that 1-hydroxyalkyl-1,4-benzodiazepin-2-one derivatives of the formula,

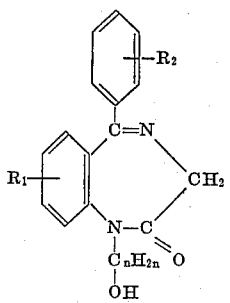

wherein $R_1$, $R_2$ and $n$ are the same as defined above, have prominent effects as tranquillizers, muscle relaxants, antispasmodics, anticonvalsants and hypnotics, and are of great importance as medicines. According to the prior art, the 1-hydroxyalkyl-1,4-benzodiazepin-2-one derivatives were obtained, for example, by synthesizing 1-unsubstituted-1,3-dihydro-2H-1,4-benzodiazepin-2-one and then hydroxy-alkylating the resultant compound with a hydroxyalkyl halide, preferably after converting the 1-unsubstituted compound into a 1-sodio derivative thereof. [J.V. Earley et al., J. Med. Chem., 11, 774–777 (1968), U.S. Pat. No. 3,391,138]

Contrary to these known processes, the present invention have found, unexpectedly, that the 1-hydroxyalkyl-1,4-benzodiazepin-2-one derivatives can be smoothly and economically prepared in high yield and high purity by oxidizing the 1-hydroxyalkyl-2-aminomethylindole derivative or a salt thereof. This new and useful process thus differs markedly from the known methods and represents an improvement thereover. Therefore the 1-hydroxyalkyl-2-aminomethylindole derivatives are very useful as intermediary substances for producing of the 1-hydroxyalkyl-1,4-benzodiazepin-2-one derivatives which are useful medicines.

Accordingly one object of the present invention is to provide novel 1-hydroxyalkyl-2-aminomethylindole derivatives and salts thereof which are useful as intermediary substances for the production of medicines.

Another object of the present invention is to provide a process for producing such useful 1-hydroxyalkyl-2-aminomethylindole derivatives and salts thereof.

Other objects and merits of the present invention will be apparent from the following description.

In order to accomplish these objects, the present invention provides 1-hydroxyalkyl-2-aminomethylindole derivatives of the aforesaid formula and acid-addition salts thereof.

The present invention further provides a process for producing 1-hydroxyalkyl-2-aminomethylindole derivatives of the aforesaid formula or acid-addition salts thereof, which comprises reducing a 1-substituted-indole-2-carbonitrile derivatives of the formula,

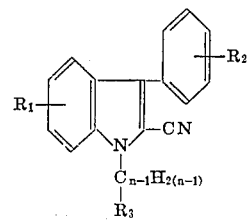

wherein $R_1$, $R_2$ and $n$ are as defined above, and $R_3$ represents $C_1$-$C_4$-alkoxycarbonyl, carboxyl or alkanoyloxymethyl, to yield the 1-hydroxyalkyl-2-aminomethylindole derivative and further, if desired, reacting the resultant 1-hydroxyalkyl-2-aminomethylindole derivative with an acid to yield the acid-addition salt thereof.

According to the process of the present invention, the reduction of the 1-substituted-indole-2-carbonitrile derivative is carried out by a conventional manner, for example, electrolytic reduction, reduction with alkali metals in alcohols, catalytic reduction using palladium-, nickel- or platinum-system catalysts, or reduction using metal hydride complexes which include lithium aluminum hydride, diborane, boron hydride and their mixture with an acid such as aluminum chloride, ferric chloride, boron trifluoride, hydrogen chloride or the like. Particularly preferable reducing agents are lithium aluminum hydride or the mixture for example, of lithium aluminum hydride and aluminum chloride, of sodium borohydride and aluminum chloride, of sodium borohydride and boron trifluoride or the like, because of their selectivity and simple handling.

The 1-hydroxyalkyl-2-aminomethylindole derivatives may form salts with mineral acids and organic acids, for example, hydrochloric, hydrobromic, sulfuric, phosphoric, methanesulfonic, ethanesulfonic, β-hydroxy-ethanesulfonic, acetic, lactic, oxalic, succinic, fumaric, maleic, malic, tartaric, citric, benzoic, salicylic, phenylacetic, mandelic and picric acids.

According to the process of the present invention, there are produced 1-hydroxyalkyl-2-aminomethylindole derivatives and acid addition salts thereof as shown below.

1-(β-Hydroxyethyl)-2-aminomethyl-3-phenylindole
1-(β-Hydroxyethyl)-2-aminomethyl-3-phenyl-5-chloroindole
1-(β-Hydroxyethyl)-2-aminomethyl-3-phenyl-5-bromoindole
1-(β-Hydroxyethyl)-2-aminomethyl-3-phenyl-5-nitroindole
1-(β-Hydroxyethyl)-2-aminomethyl-3-phenyl-5-trifluoromethylindole
1-(β-Hydroxyethyl)-2-aminomethyl-3-(o-fluorophenyl)-indole
1-(β-Hydroxyethyl)-2-aminomethyl-3-(o-fluorophenyl)-5-chloroindole
1-(β-Hydroxyethyl)-2-aminomethyl-3-(o-chlorophenyl)-5-chloroindole
1-(β-Hydroxyethyl)-2-aminomethyl-3-(p-chlorophenyl)-5-chloroindole
1-(β-Hydroxyethyl)-2-aminomethyl-3-(p-bromophenyl)-5-chloroindole
1-(β-Hydroxyethyl)-2-aminomethyl-3-phenyl-5-chloroindole
1-(β-Hydroxyethyl)-2-aminomethyl-3-(o-bromophenyl)-5-chloroindole
1-(β-Hydroxyethyl)-2-aminomethyl-3-(o-tolyl)-5-chloroindole
1-(γ-Hydroxypropyl)-2-aminomethyl-3-phenyl-5-chloroindole
1-(β-Hydroxypropyl)-2-aminomethyl-3-(o-chlorophenyl)-5-chloroindole 1-(γ-Hydroxypropyl)-2-aminomethyl-3-(o-fluorophenyl)-5-chloroindole 1-(γ-Hydroxypropyl)-2-aminomethyl-3-(o-chlorophenyl)-5-chloroindole 1-(β-Hydroxy-α-methyl-ethyl)-2-aminomethyl-3-phenyl-5-chloroindole 1-Hydroxymethyl-2-aminomethyl-3-phenyl-5-chloroindole.

1-substituted-indole-2-carbonitrile derivatives used as the starting material in the process of the present invention are produced by condensing a corresponding 1-unsubstituted-indole-2-carbonitrile derivative of the formula,

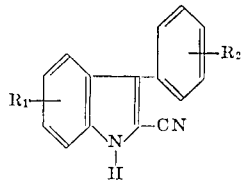

wherein $R_1$ and $R_2$ are as defined above, with a compound of the formula, $$X - C_{n-1}H_{2(n-1)}R_3$$

wherein $R_3$ and $n$ are the same as defined above, and X represents chlorine, bromine, iodine, methanesulfonyloxy, p-toluenesulfonyloxy, β-naphthalenesulfonyloxy or trichloromethane sulfonyloxy, in the presence of an alkaline agent, or condensing a metal salt of the 1-unsubstituted-indole-2-carbonitrile derivative with the compound of the aforesaid formula.

Examples of the alkaline agent include alkali metal hydride such as sodium hydride or lithium hydride, alkali metal hydroxide such as potassium hydroxide, alkali metal amide such as sodium amide, potassium amide or lithium amide, alkylalkali such as butyl lithium, phenylalkali such as phenyl lithium, alkali metal alcoholate such as sodium methylate, sodium ethylate, potassium tertiary-butoxide or the like. The reaction may generally be effected in an organic solvent or solvent mixture. Suitable solvents include benzene, toluene, xylene, dioxane, dimethylformamide, dimethylacetamide, diphenyl ether, diglyme, dimethyl sulfoxide, methyl ethyl ketone, N-methyl pyrrolidone and the like, and a solvent mixture thereof. The reaction may be carried out at a temperature within the range between about room temperature and the boiling point of the solvent employed.

1-substituted-indole-2-carbonitrile derivative of the formula,

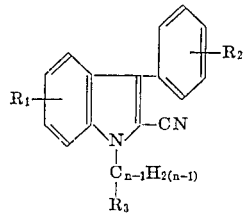

wherein $R_3$ is carboxyl group, can also be prepared by hydrolyzing the corresponding compound of the formula,

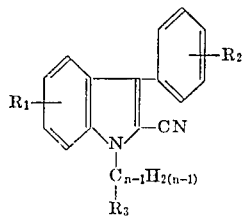

wherein $R_3$ is alkoxycarbonyl.

The present invention is further disclosed in the following examples of preferred embodiments thereof, which are presented for the purpose of illustration and are not intended to limit the scope of the invention.

EXAMPLE 1

To a solution of 0.8 g of 1-(β-acetoxyethyl)-2-cyano-3-(o-fluorophenyl)-5-chloroindole in 50 ml of anhydrous ether is added 1 g of lithium aluminum hydride and the mixture is heated under reflux for 12 hours. The reaction mixture is cooled, and water is added dropwise thereto. The ethereal layer is separated by decantation, and the residue is extracted with ether. The ethereal layers are combined and dried over sodium sulfate, and concentrated to dryness. The residue is dissolved in anhydrous ether and treated with ethereal hydrogen chloride to give 1-(β-hydroxyethyl)-2-aminomethyl-3-(o-fluorophenyl)-5-chloroindole hydrochloride, which is recrystallized from methanol-acetone to give colorless plates, m.p. 240°–241° C (decomposition).

EXAMPLE 2

According to the procedure similar to that in Example 1, except that 1 g of 1-(methoxycarbonylmethyl)-2-cyano-3-(o-fluorophenyl)-5-chloroindole is used instead of 0.8 g of 1-(β-acetoxyethyl)-2-cyano-3-(o-fluorophenyl)-5-chloroindole, there is obtained 1-(β-hydroxyethyl)-2-aminomethyl-3-(o-fluorophenyl)-5-chloroindole hydrochloride. This product is identical with the product prepared in Example 1.

EXAMPLE 3

According to the procedure similar to that in Example 1, except that 1-(carboxymethyl)-2-cyano-3-(o-fluorophenyl)-5-chloroindole is used instead of 1-(β-acetoxyethyl)-2-cyano-3-(o-fluorophenyl)-5-chloroindle, there is obtained 1-(β-hydroxyethyl)-2-aminomethyl-3-(o-fluorophenyl)-5-chloroindole hydrochloride. This product is identical with the product obtained in Example 1.

EXAMPLE 4

According to the procedure similar to that in Example 1, except that 1-(ethoxycarbonylmethyl)-2-cyano-3-(o-fluorophenyl)-5-chloroindole is used instead of 1-(β-acetoxyethyl)-2-cyano-3-(o-fluorophenyl)-5-chloroindole, there is obtained 1-(β-hydroxyethyl)-2-aminomethyl-3-(o-fluorophenyl)-5-chloroindole hydrochloride. This product is identical with the product prepared in Example 1.

What we claim is:

1. A compound of the formula

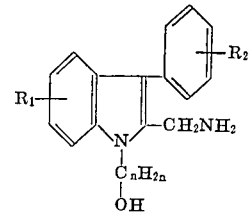

wherein $R_1$ and $R_2$ each represent hydrogen, halogen, $C_1$–$C_4$ — alkyl, trifluoromethyl or nitro and $n$ represents an integer of 1 to 4, and acid-addition salts thereof.

2. A compound of the formula

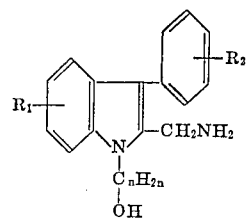

wherein $R_1$ and $R_2$ each represent halogen and $n$ represents an integer of 1 to 4, and acid-addition salts thereof.
3. A compound of the formula
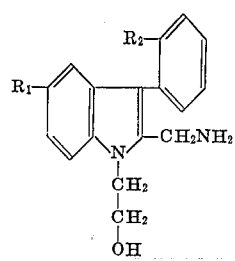
wherein $R_1$ and $R_2$ each represent halogen, and acid addition salts thereof.
4. A compound of the formula
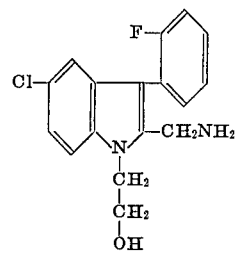
and acid-addition salts thereof.
* * * * *